(12) United States Patent
Spencer

(10) Patent No.: US 8,344,079 B2
(45) Date of Patent: Jan. 1, 2013

(54) MOLAR RATIO MODIFICATIONS TO LARGER POLYOLEFIN CATALYSTS

(75) Inventor: Michael D. Spencer, Houston, TX (US)

(73) Assignee: BASF Corporation, Florham Park, NJ (US)

( * ) Notice: Subject to any disclaimer, the term of this patent is extended or adjusted under 35 U.S.C. 154(b) by 153 days.

(21) Appl. No.: 11/967,815

(22) Filed: Dec. 31, 2007

(65) Prior Publication Data

US 2009/0171044 A1    Jul. 2, 2009

(51) Int. Cl.
*C08F 4/50*    (2006.01)

(52) U.S. Cl. ............... 526/124.3; 502/104; 502/116; 526/943

(58) Field of Classification Search ............ 502/104, 502/116; 526/124.3, 943
See application file for complete search history.

(56) References Cited

U.S. PATENT DOCUMENTS

| | | | |
|---|---|---|---|
| 4,639,430 A | 1/1987 | Pasquet et al. | |
| 4,784,983 A | 11/1988 | Mao et al. | |
| 5,064,799 A | 11/1991 | Monte et al. | |
| 5,227,439 A | 7/1993 | Luciani et al. | |
| 5,244,854 A | 9/1993 | Noristi et al. | |
| 5,633,419 A | 5/1997 | Spencer et al. | |
| 5,661,097 A | 8/1997 | Spencer et al. | |
| 5,798,314 A | 8/1998 | Spencer et al. | |
| 6,376,417 B1 | 4/2002 | Yang et al. | |
| 6,617,278 B1 | 9/2003 | Jin et al. | |
| 2002/0010081 A1 | 1/2002 | Li et al. | |
| 2004/0030064 A1 | 2/2004 | Wang et al. | |

FOREIGN PATENT DOCUMENTS

| | | |
|---|---|---|
| EP | 1260523 | 11/2002 |
| EP | 1970388 | 9/2008 |

OTHER PUBLICATIONS

International Search Report for International Application No. PCT/US2008/085334 mailed on Mar. 17, 2009 corresponding to U.S. Appl. No. 11/967,815, filed Dec. 31, 2007.
Written Opinion of the International Searching Authority for International Application No. PCT/US2008/085334 mailed on Mar. 17, 2009 corresponding to U.S. Appl. No. 11/967,815, filed Dec. 31, 2007.

*Primary Examiner* — Rebecca Anderson
*Assistant Examiner* — Sonya Wright
(74) *Attorney, Agent, or Firm* — Bernard Lau

(57) ABSTRACT

Disclosed are catalyst systems and methods of making the catalyst systems/supports for the polymerization of an olefin containing a solid titanium catalyst component having a substantially spherical shape and containing an internal electron donor, a support made by contacting substantially equal molar amounts of a magnesium compound and an epoxy compound in the presence of an aprotic solvent and subsequent treatment with a halogenating agent to provide a magnesium based catalyst support. The catalyst system can further contain an organoaluminum compound and an organosilicon compound. Also disclosed are methods of polymerizing or copolymerizing an alpha-olefin. The methods involve contacting an olefin with a catalyst system containing the solid titanium catalyst component.

18 Claims, 3 Drawing Sheets

US 8,344,079 B2

MOLAR RATIO MODIFICATIONS TO LARGER POLYOLEFIN CATALYSTS

TECHNICAL FIELD

The subject innovation generally relates to olefin polymerization catalyst systems and methods of making the catalyst systems and olefin polymers and copolymers made therewith.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a stereoregulated polymer.

Numerous Ziegler-Natta polymerization catalysts exist. The catalysts have different characteristics and/or lead to the production of polyolefins having diverse properties. For example, certain catalysts have high activity while other catalysts have low activity, and similarly certain catalysts have a long life while other catalysts have a short life. Moreover, polyolefins made with the use of Ziegler-Natta polymerization catalysts vary in stereoregularity, molecular weight distribution, impact strength, melt-flowability, rigidity, heat sealability, isotacticity, and the like.

Useful Ziegler-Natta polymerization catalysts made through a precipitation method are made using an organic magnesium compound starting material. The organic magnesium compound leads to the formation of a desirable spherical catalyst particle. Replacing the organic magnesium compound starting material with a markedly less expensive magnesium halide results in a catalyst particle with a morphology that is difficult to control and aspherical or the use of expensive capital processes such as spray congealing (processes where $MgCl_2$ is mixed with ethanol, heated to form a meld, and then sprayed through a nozzle into a cold liquid or gas).

SUMMARY

The following presents a simplified summary of the innovation in order to provide a basic understanding of some aspects of the innovation. This summary is not an extensive overview of the innovation. It is intended to neither identify key or critical elements of the innovation nor delineate the scope of the innovation. Rather, the sole purpose of this summary is to present some concepts of the innovation in a simplified form as a prelude to the more detailed description that is presented hereinafter.

The subject innovation provides olefin polymerization catalyst systems, methods of making the olefin polymerization catalyst systems, and methods of polymerizing and copolymerizing olefins involving the use of a solid titanium catalyst component containing a catalyst support. The catalyst support can be made by contacting substantially equal molar amounts of a magnesium compound and an epoxy compound to provide a magnesium material that is liquid or can be dispersed into non hydrocarbon solvents and then precipitated to form the catalyst support by treating with a titanium compound to substantially remove the epoxy and subsequent reaction product compounds and replace them with halide. By contacting a magnesium compound and an epoxy compound and an aprotic solvent, a magnesium alkoxide material is formed which can be used to for a magnesium containing emulsion where the surface tension factors can be controlled (e.g., increased). The type and molar ratios of both the epoxy and aprotic compounds had a profound effect upon the emulsion stability. As a result, the solid titanium catalyst component and catalyst support can be produced with substantially spherical and controllable shape at relatively large particle sizes.

The catalyst support can be made by contacting substantially equal amounts of an epoxy compound with magnesium halide in the presences of a highly polar aprotic organic solvent and then with halogenating agent. The epoxy compound reacts in the presence of the aprotic solvent to form a magnesium alkoxy compound that is a liquid or can be dispersed into non-polar organic solvents. This material, when reacted with the halogenating agent, forms an oil phase that can be dispersed into non-polar organic solvents and form an emulsion. This emulsion is not thermally stable and with elevated temperature forms solid catalyst support material. By manipulating the amounts of the epoxy compound and the aprotic compound the surface tension of the emulsion intermediate can be controlled (e.g. increased). As a result, the solid titanium catalyst component and catalyst support can be substantially spherical and controllable shape at relatively large catalyst sizes.

The subject innovation also provides methods of polymerizing or copolymerizing an olefin. The methods involve contacting an olefin with a catalyst system containing a solid titanium catalyst component. The solid titanium catalyst component contains a titanium compound; an internal electron donor; and a support made by contacting substantially equal molar amounts of a magnesium compound and an epoxy compound in the presences of a highly polar aprotic organic solvent and then with halogenating agent to provide a magnesium based catalyst support.

To the accomplishment of the foregoing and related ends, the innovation involves the features hereinafter fully described and particularly pointed out in the claims. The following description and the annexed drawings set forth in detail certain illustrative aspects and implementations of the innovation. These are indicative, however, of but a few of the various ways in which the principles of the innovation may be employed. Other objects, advantages and novel features of the innovation will become apparent from the following detailed description of the innovation when considered in conjunction with the drawings.

DETAILED DESCRIPTION

Figure 1:
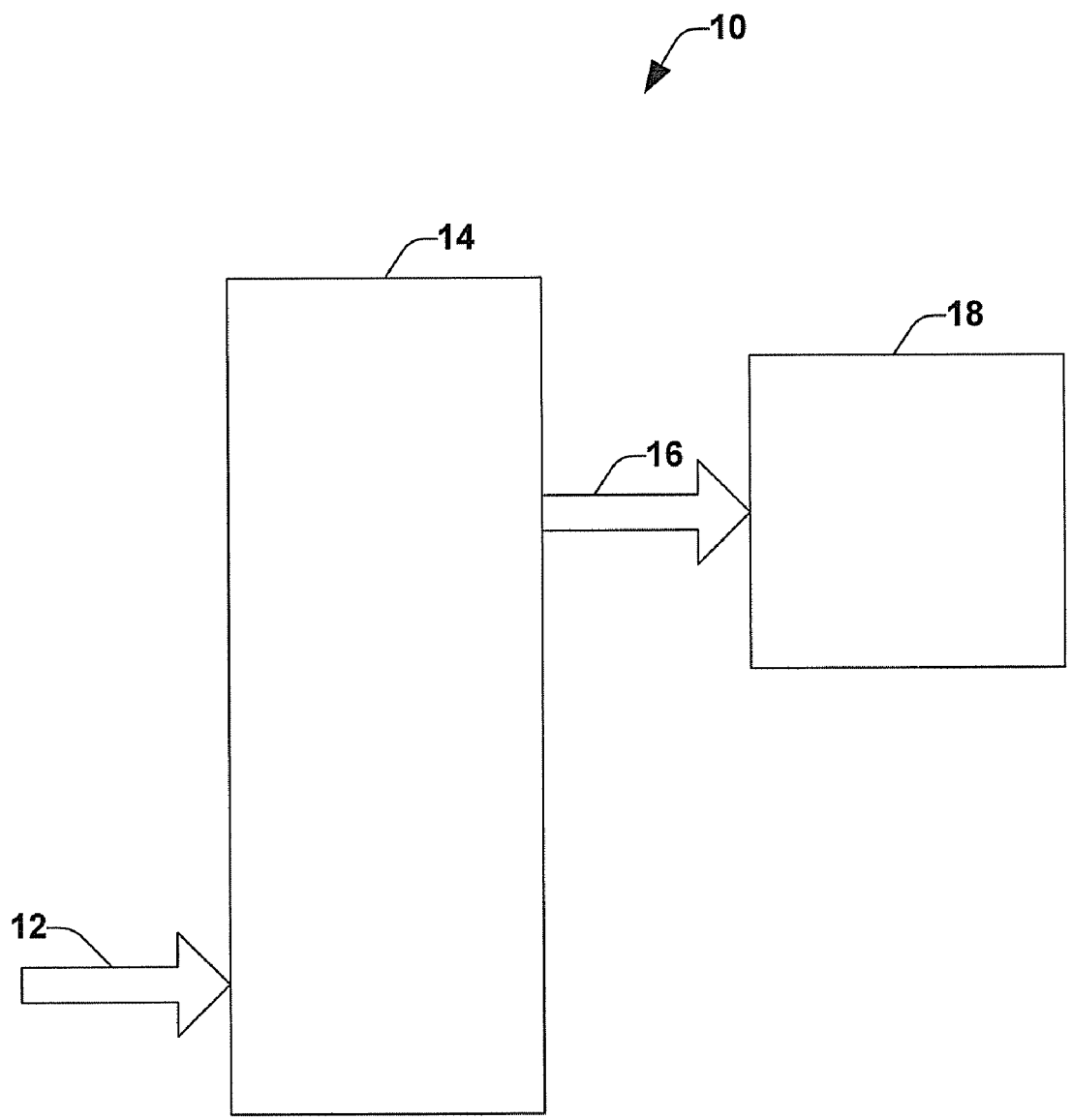
FIG. 1 is a high level schematic diagram of an olefin polymerization system in accordance with one aspect of the subject innovation.

The subject innovation relates to catalyst supports, solid titanium catalyst components, catalyst systems, methods of making catalyst supports, solid titanium catalyst components, and catalyst systems, and methods of making polyolefins.

An aspect of the innovation is forming the catalyst support by contacting substantially equal molar amounts of a magnesium compound and an epoxy compound. The catalyst support can be made by contacting substantially equal molar amounts of a magnesium compound and an epoxy compound in the presence of an aprotic solvent to provide an intermediate and then contacting the intermediate with a halogenting agent to form the magnesium based catalyst support. The substantially equal molar amounts of magnesium compound and the epoxy compound can be contacted in the presence of a titanium compound and/or an internal electron donor.

Use of the substantially equal molar amounts of the magnesium compound and the epoxy compound contributes to the ability to form a more spherical catalyst support of relatively large and controllable size, and consequently, a more spherical solid titanium catalyst component of relatively large size. The presence of an aprotic solvent during contact between the magnesium compound and the epoxy compound also contributes to the ability to form a more spherical catalyst support of relatively large and controllable size. In one embodiment, the size (e.g., diameter) of catalyst support particles formed in accordance with the subject innovation is from about 5 microns to about 90 microns (on a 50% by volume basis). In another embodiment, the size (diameter) of catalyst support particles is from about 7 microns to about 85 microns (on a 50% by volume basis). In yet another embodiment, the size (diameter) of catalyst support particles is from about 10 microns to about 80 microns (on a 50% by volume basis).

Substantially spherically shaped catalyst supports are particles which satisfy the following condition:

$$f=\sqrt{[A/(\pi/4)]}/D_{max}$$

in which f is greater than about 0.7, A is the cross-sectional area in mm², and $D_{max}$ is the maximum diameter of the cross-sectional area in mm. The factor f is a measure of the degree of sphericalness of the catalyst support particles. The closer f is to 1, the closer the shape of the particles is to an ideal spherical shape. In another embodiment, the substantially spherically shaped catalyst supports have an f value is greater than about 0.8. In yet another embodiment, the substantially spherically shaped catalyst supports have an f value is greater than about 0.9.

When the catalyst support is made using substantially equal molar amounts of a magnesium compound and an epoxy compound, a catalyst system is provided that produces polymer product having a narrow particle size distribution is obtained. In one embodiment, the particle size span is from about 0.25 to about 1.75. In another embodiment, the particle size span is from about 0.5 to about 1.5. In yet another embodiment, the particle size span is from about 0.7 to about 1.1. The unitless value of particle size span is determined by subtracting the D10 size from the D90 size, then dividing by the D50 size.

The relatively large size and substantially spherical shape of the catalyst support and solid titanium catalyst component contribute to the ability of the catalyst system in various polymerization methods to provide an improved level of control over the properties of the resultant polymer product (glass transition temperature, adhesion properties, coefficients of temperature induced expansion/contraction, improved flowability, and the like).

Using substantially equal molar amounts of a magnesium compound and an epoxy compound to form a catalyst support can permit one to eliminate the requirement of spray drying, spray cooling, and/or forming an emulsion to form the catalyst support. Using substantially equal molar amounts of a magnesium compound and an epoxy compound to form a catalyst support further can permit one to mitigate waste streams commonly associated with forming catalyst supports and solid titanium catalyst components.

When the catalyst support is made using substantially equal molar amounts of a magnesium compound and an epoxy compound, a catalyst system is provided that produces polymer product having a controlled and/or relatively large size and shape. The shape of the resultant polymer product is substantially spherical. In one embodiment, using the catalyst support, catalyst system, and/or methods of the subject innovation, the polymer product has a substantially spherical shape and an average diameter of about 500 microns or more (on a 50% by volume basis). In another embodiment, the polymer product has a substantially spherical shape and an average diameter of about 600 microns or more (on a 50% by volume basis). In yet another embodiment, the polymer product has a substantially spherical shape and an average diameter of about 700 microns or more (on a 50% by volume basis). In yet another embodiment, the polymer product has a substantially spherical shape and an average diameter of about 1,000 microns or more (on a 50% by volume basis). The relatively large size of the polymer product permits the polymer product to contain a high amount of rubber without deleteriously affecting flow properties.

The subject innovation further relates to an olefin polymerization catalyst system containing a solid titanium catalyst component made by contacting substantially equal molar amounts of a magnesium compound and an epoxy compound to provide a magnesium based catalyst support and treating the magnesium based catalyst support with a titanium compound; an organoaluminum compound; and an organosilicon compound; and a polymerization process which involves polymerizing or copolymerizing olefins in the presence of the polymerization catalyst system described above.

Generally speaking, the magnesium based catalyst support is made by contacting substantially equal molar amounts of at least one magnesium compound and at least one epoxy compound in the presence of an aprotic solvent then contacting with halogenating agent. When the magnesium compound is subsequently reconstituted, recrystallized, and/or recovered, it has a relatively large particle size and substantially spherical shape. These desirable and beneficial properties are not obtained when substantially equal molar of a magnesium compound and an epoxy compound are otherwise not employed. Contacting unequal molar amounts of a magnesium compound and an epoxy compound may lead to undesired morphology; for example, to the formation of non-spherical or irregular catalyst support.

The magnesium compounds used in the preparation of the catalyst support and ultimately the solid titanium catalyst component include, for example, a magnesium compound having no reducibility. In one embodiment, the magnesium compound having no reducibility is a halogen containing magnesium compound. Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

In one aspect, halogen containing magnesium compounds, such as magnesium chloride, alkoxy magnesium chlorides and aryloxy magnesium chlorides, are employed.

The epoxy compounds used in the preparation of the catalyst support and ultimately the solid titanium catalyst component include, for example, compounds having at least one epoxy group in the form of monomers, dimmers, oligomers and polymers. Examples of epoxy compounds include aliphatic epoxy compounds, alicyclic epoxy compounds, aromatic epoxy compounds, or the like. Examples of aliphatic epoxy compounds include halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of alicyclic epoxy compounds include halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of aliphatic epoxy compounds include ethylene oxide, propylene oxide, 1,2-epoxybutane, 2,3-epoxybutane, 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, 7,8-epoxy-2-methyloctadecane, 2-vinyloxirane, 2-methyl-2-vinyloxirane, 1,2-epoxy-5-hexene, 1,2-epoxy-7-octene, 1-phenyl-2,3-epoxypropane, 1-(1-naphthyl)-2,3-epoxypropane, 1-cyclohexyl-3,4-epoxybutane, 1,3-butadiene dioxide, 1,2,7,8-diepoxyoctane, or the like. Specific examples of alicyclic epoxy compounds include cyclopentene oxide, 3-methyl-1,2-cyclopentene oxide, cyclohexene oxide, cyclooctene oxide, alpha-pinene oxide, 2,3-epoxynorbornane, limonene oxide, cyclododecane epoxide, 2,3,5,6-diepoxynorbornane, or the like. Specific examples of aromatic epoxy compounds include styrene oxide, 3-methylstyrene oxide, 1,2-epoxybutylbenzene, 1,2-epoxyoctylbenzene, stilbene oxide, 3-vinylstyrene oxide, 1-(1-methyl-1,2-epoxyethyl)-3-(1-methylvinyl)benzene, 1,4-bis(1,2-epoxypropyl)benzene, 1,3-bis(1,2-epoxy-1-methylethyl)benzene, 1,4-bis(1,2-epoxy-1-methylethyl)benzene;

Specific examples of halogenated aliphatic epoxy compounds include epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, 1-(2,3-epoxypropyl)-4-chlorobenzene, 1-(3,4-epoxybutyl)-3-chlorobenzene, or the like. Specific examples of halogenated alicyclic epoxy compounds include 4-fluoro-1,2-cyclohexene oxide, 6-chloro-2,3-epoxybicyclo[2.2.1]heptane, or the like. Specific examples of halogenated aromatic epoxy compounds include 4-fluorostyrene oxide, 1-(1,2-epoxypropyl)-3-trifluorobenzene, or the like.

Specific examples of aliphatic epoxy compounds having a keto group include 3-acetyl-1,2-epoxypropane, 4-benzoyl-1,2-epoxybutane, 4-(4-benzoyl)phenyl-1,2-epoxybutane, 4,4'-bis(3,4-epoxybutyl)benzophenone, or the like. Specific examples of alicyclic epoxy compounds having a keto group include 3,4-epoxy-1-cyclohexanone, 2,3-epoxy-5-oxobicyclo[2.2.1]heptane, or the like. Specific examples of aromatic epoxy compounds having a keto group include 3-acetylstyrene oxide, 4-(1,2-epoxypropyl)benzophenone, or the like.

Specific examples of aliphatic epoxy compounds having an ether bond include glycidyl methyl ether, butyl glycidyl ether, 2-ethylhexyl glycidyl ether, allyl glycidyl ether, ethyl 3,4-epoxybutyl ether, glycidyl phenyl ether, glycidyl 4-tert-butylphenyl ether, glycidyl 4-chlorophenyl ether, glycidyl 4-methoxyphenyl ether, glycidyl 2-phenylphenyl ether, glycidyl 1-naphthyl ether, glycidyl 4-indolyl ether, glycidyl N-methyl-alpha-quinolon-4-yl ether, ethyleneglycol diglycidyl ether, 1,4-butanediol diglycidyl ether, 1,2-diglycidyloxybenzene, 2,2-bis(4-glycidyloxyphenyl)propane, tris(4-glycidyloxyphenyl)methane, poly(oxypropylene)triol triglycidyl ether, a glycidyl ether of phenol novolac, or the like. Specific examples of alicyclic epoxy compounds having an ether bond include 1,2-epoxy-4-methoxycyclohexane, 2,3-epoxy-5,6-dimethoxybicyclo[2.2.1]heptane, or the like. Specific examples of aromatic epoxy compounds having an ether bond include 4-methoxystyrene oxide, 1-(1,2-epoxybutyl)-2-phenoxybenzene, or the like.

Specific examples of aliphatic epoxy compounds having an ester bond include glycidyl formate, glycidyl acetate, 2,3-epoxybutyl acetate, glycidyl butyrate, glycidyl benzoate, diglycidyl terephthalate, poly(glycidyl acrylate), poly(glycidyl methacrylate), a copolymer of glycidyl acrylate with another monomer, a copolymer of glycidyl methacrylate with another monomer, or the like. Specific examples of alicyclic epoxy compounds having an ester bond include 1,2-epoxy-4-methoxycarbonylcyclohexane, 2,3-epoxy-5-butoxycarbonylbicyclo[2.2.1]heptane, or the like. Specific examples of aromatic epoxy compounds having an ester bond include ethyl 4-(1,2-epoxyethyl)benzoate, methyl 3-(1,2-epoxybutyl)benzoate, methyl 3-(1,2-epoxybutyl)-5-phenylbenzoate, or the like.

Specific examples of aliphatic epoxy compounds having a tertiary amino group include N,N-glycidylmethylacetamide, N,N-ethylglycidylpropionamide, N,N-glycidylmethylbenzamide, N-(4,5-epoxypentyl)-N-methylbenzamide, N,N-diglycidylaniline, bis(4-diglycidylaminophenyl)methane, poly(N,N-glycidylmethylacrylamide), or the like. Specific examples of alicyclic epoxy compounds having a tertiary amino group include 1,2-epoxy-3-(diphenylcarbamoyl)cyclohexane, 2,3-epoxy-6-(dimethylcarbamoyl)bicyclo[2.2.1]heptane, or the like. Specific examples of aromatic epoxy compounds having a tertiary amino group include 2-(dimethylcarbamoyl)styrene oxide, 4-(1,2-epoxybutyl)-4'-(dimethylcarbamoyl)biphenyl, or the like.

Specific examples of aliphatic epoxy compounds having a cyano group include 4-cyano-1,2-epoxybutane, 1-(3-cyanophenyl)-2,3-epoxybutane, or the like. Specific examples of alicyclic epoxy compounds having a cyano group include 2-cyanostyrene oxide, 6-cyano-1-(1,2-epoxy-2-phenylethyl)naphthalene, or the like.

Substantially equal molar amounts of the magnesium compound and the epoxy compound are contacted to form the catalyst support. In one embodiment, the molar ratio of magnesium compound to epoxy compound is from about 1:0.75 to about 1:1.25. In another embodiment, the molar ratio of magnesium compound to epoxy compound is from about 1:0.8 to about 1:1.2. In yet another embodiment, the molar ratio of magnesium compound to epoxy compound is from about 1:0.9 to about 1:1.1. In still yet another embodiment, the molar ratio of magnesium compound to epoxy compound is from about 1:0.95 to about 1:1.05.

The relative molar amounts of the magnesium compound and the aprotic solvent also contribute to controlling the spherical nature and relatively large size of the resultant catalyst support. In one embodiment, the molar ratio of magnesium compound to aprotic solvent is from about 1:0.7 to about 1:1.2. In another embodiment, the molar ratio of magnesium compound to aprotic solvent is from about 1:0.8 to about 1:1.1. In yet another embodiment, the molar ratio of magnesium compound to aprotic solvent is from about 1:0.85 to about 1:1.

Aprotic solvents are solvents that share ion dissolving power with protic solvents but lack an acidic hydrogen. Polar aprotic solvents generally have high dielectric constants and high polarity. Examples of aprotic solvents include tributyl phosphate, tetrahydrofuran, dimethyl sulfoxide, dimethylformamide, and hexamethylphosphorotriamide.

The magnesium compound, epoxy compound, and the aprotic solvent form an intermediate. When the ratios are ahered to, surface tensions permit the formation of substantially spherical materials, which leads to the subsequent formation of substantially spherical shaped catalyst support particles. In other words, when one or both of the relative molar amounts of magnesium compound, epoxy compound, and the aprotic solvent are not followed, elongated particles (non-spherical) are undesirably formed. The intermediate is contacted with a halogenating agent (compound that contains at least halogen atom, such as chlorine, that can be transferred). Contact with the halogenating agent forms an oil which forms in a hydrocarbon solvent where it can be subsequently solidified into the substantially spherical shaped catalyst support particles.

In one embodiment, when the catalyst support is formed, a surfactant is used. The surfactant can contribute to many of the beneficial properties of the catalyst support and catalyst system. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of monomers that be polymerized using known polymerization techniques into polymer surfactants include one or more of acrylate; tert-butyl acrylate; n-hexyl acrylate; methacrylate; methyl methacrylate; ethyl methacrylate; propyl methacrylate; isopropyl methacrylate; n-butyl methacrylate; t-butyl methacrylate; isobutyl methacrylate; pentyl methacrylate; isoamyl methacrylate; n-hexyl methacrylate; isodecyl methacrylate; lauryl methacrylate; stearyl methacrylate; isooctyl acrylate; lauryl acrylate; stearyl acrylate; cyclohexyl acrylate; cyclohexyl methacrylate; methoxy ethyl acrylate; isobenzyl acrylate; isodecyl acrylate; n-dodecyl acrylate; benzyl acrylate; isobornyl acrylate; isobornyl methacrylate; 2-hydroxyethyl acrylate; 2-hydroxypropyl acrylate; 2-methoxyethyl acrylate; 2-methoxybutyl acrylate; 2-(2-ethoxyethoxy)ethyl acrylate; 2-phenoxyethyl acrylate; tetrahydrofurfuryl acrylate; 2-(2-phenoxyethoxy)ethyl acrylate; methoxylated tripropylene glycol monoacrylate; 1,6-hexanediol diacrylate; ethylene glycol dimethacrylate; diethylene glycol dimethacrylate; triethylene glycol dimethacrylate; polyethylene glycol dimethacrylate; butylene glycol dimethacrylate; trimethylolpropane 3-ethoxylate triacrylate; 1,4-butanediol diacrylate; 1,9-nonanediol diacrylate; neopentyl glycol diacrylate; tripropylene glycol diacrylate; tetraethylene glycol diacrylate; heptapropylene glycol diacrylate; trimethylol propane triacrylate; ethoxylated trimethylol propane triacrylate; pentaerythritol triacrylate; trimethylolpropane trimethacrylate; tripropylene glycol diacrylate; pentaerythritol tetraacrylate; glyceryl propoxy triacrylate; tris(acryloyloxyethyl)phosphate; 1-acryloxy-3-methacryloxy glycerol; 2-methacryloxy-N-ethyl morpholine; and allyl methacrylate, and the like.

In one embodiment, non-ionic surfactants and/or anionic surfactants can be used. Examples of non-ionic surfactants and/or anionic surfactants include phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitriles, benzene, naphthalene, anthracene, succinic anhydride, phthalic anhydride, rosin, terpene, phenol, or the like. In fact a number of anhydride surfactants are effective. In some instances, the absence of an anhydride surfactant causes the formation of very small catalyst support particles while the over use creates straw shaped material sometimes referred to as needles.

The surfactant is typically added in a mixture with an organic solvent. When added as a mixture with an organic solvent, the volume ratio of surfactant to organic solvent is from about 1:10 to about 2:1. In another embodiment, the volume ratio of surfactant to organic solvent is from about 1:6 to about 1:1. In yet another embodiment, the volume ratio of surfactant to organic solvent is from about 1:4 to about 1:2.

The organic medium in which the magnesium compound, epoxy compound, and aprotic solvent are contacted and/or the intermediate and halogenated intermediate compound are contacted/formed include one or more organic solvents and/or organic liquids. The organic solvent is capable of forming an emulsion with the intermediate and/or halogenated intermediate compound. Examples of organic solvents include aromatic solvents such as toluene, xylenes, benzene, ethyl benzene, naphthalene, and the like, alkanes such as butane, pentane, hexane, heptane, octanes, cyclopentane, and cyclohexane; oxygen containing compounds such as alcohols and glycols; ketones; esters; ethers; and the like.

Once the intermediate is formed, a halogenating agent is contacted with the intermediate to form the magnesium based catalyst support. Examples of halogenating agents include titanium tetrahalide such as titanium tetrachloride, other metal halide compounds such as metal chlorides, HCl, thionyl chloride, chlorine gas, and the like. The magnesium based catalyst support initially forms as an oil, and then as the temperature is increased, the oil solidifies in a spherical shape thereby giving physical solid structure to the magnesium based catalyst support.

The magnesium based catalyst support is recovered from the mixture by any suitable means, such as precipitation techniques. In one embodiment, however, the magnesium based catalyst support is not formed using spray drying. In another embodiment, the magnesium based catalyst support is not dealcoholed.

The solid titanium catalyst component of the subject innovation is a highly active catalyst component containing at least an internal electron donor and the catalyst support. The catalyst support can be made by contacting substantially equal molar amounts of a magnesium compound and an epoxy compound in the presence of an aprotic solvent and then halogentating. The solid titanium catalyst component can be prepared by contacting the catalyst support and a titanium compound. As explained in detail below, in another embodiment, the solid titanium catalyst component can be prepared by forming the catalyst support in the presence of a titanium compound. In yet another embodiment, the solid titanium catalyst component can be prepared by forming the catalyst support in the presence of a first titanium compound and then contacting the catalyst support with a second titanium compound. The first titanium compound can be the same as or different from the second titanium compound.

The titanium compounds used in the preparation of the solid titanium catalyst component in the subject innovation include, for example, a tetravalent titanium compound represented by Formula (I)

$$Ti(OR)_gX_{4-g} \quad (I)$$

wherein each R independently represents a hydrocarbon group, preferably an alkyl group having 1 to about 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{ n-}C_4H_9)Cl_3$, $Ti(OC_2H_5)Br_3$ and $Ti(O\text{ iso-}C_4H_9)Br_3$; dialkoxytitanium dihalides such as $Ti(OCH_3)_2Cl_2$, $Ti(OC_2H_5)_2Cl_2$, $Ti(O\text{ n-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\text{ n-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\text{ n-}C_4H_9)_4$.

Among these, the halogen containing titanium compounds, especially titanium tetrahalides, are preferred in some instances. These titanium compounds may be used individually or in a combination of two or more. They may be used as dilutions in hydrocarbon compounds or halogenated hydrocarbons.

When preparing the solid titanium catalyst component, an internal electron donor can be used/added. Internal electron donors, for example, oxygen-containing electron donors such as alcohols, certain organosilicon compounds, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to about 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isoplropylbenzyl alcohol; phenols having 6 to about 25 carbon atoms such as phenol, resol, xylenol, ethylphenol, propylphenol, cumylphenol, nonylphenol and naphthol; ketones having about 3 to about 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, gamma-butyrolactone, delta-valerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

Esters may also be employed as internal electron donors for use with the titanium catalyst component. Examples of these esters are compounds represented by the following formulae

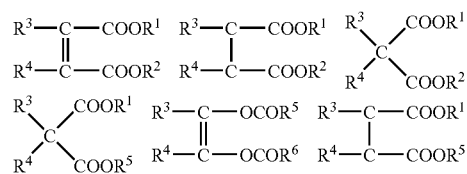

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms.

Examples of the substituted hydrocarbon groups for $R^1$ through $R^5$ are hydrocarbon groups having groups containing hetero atoms such as N, O and S, for example, C—O—C, COOR, COOH, OH, $SO_3H$, —C—N—C— and $NH_2$. Especially preferred are diesters of dicarboxylic acids in which at least one of $R^1$ and $R^2$ is an alkyl group having at least about 2 carbon atoms.

Specific examples of polycarboxylic acid esters include aliphatic polycarboxylic acid esters such as diethyl succinate, dibutyl succinate, diethyl methylsuccinate, dipropylsuccinate, dipentylsuccinate, dihexylsuccinate, dioctylsuccinate, didecylsuccinate, butlyoctylsuccinate, didodecylsuccinate, and other alkylsuccinates, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4-furanedicarboxylic acid esters. Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred.

Another group of internal electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH$—, $C_2H_5CH(CH_3)$—, $(CH_3)_2CHCH_2$—, $(CH_3)_3C$—, $C_2H_5CH$—, $(CH_3)CH_2$—, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

The internal electron donors may be used individually or in combination. In employing the internal electron donor, they do not have to be used directly as starting materials, but compounds convertible to the electron donors in the course of preparing the titanium catalyst components may also be used as the starting materials.

The solid titanium catalyst component may be formed by contacting the magnesium containing catalyst support, the titanium compound, and the internal electron donor by known methods used to prepare a highly active titanium catalyst component from a magnesium support, a titanium compound, and an electron donor.

Several examples of the method of producing the solid titanium catalyst component are briefly described below.

(1) The magnesium based catalytic support optionally with the internal electron donor, is reacted with the titanium compound in the liquid phase.

(2) The magnesium based catalytic support and the titanium compounds are reacted in the presence of the internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The product obtained in (1) to (4) is treated with a halogen, a halogen compound or an aromatic hydrocarbon.

(6) A magnesium based catalytic support is reacted with the optional internal electron donor, the titanium compound and/or a halogen-containing hydrocarbon.

(7) The magnesium based catalytic support is reacted with the titanium compound in the liquid phase, filtered and washed. The reaction product is further reacted with the internal electron donor and the titanium compound, then activated with additional titanium compound in an organic medium.

In embodiments of making the solid titanium catalyst component according to examples (2), (3), (4) and (5), the magnesium based catalytic support solution is mixed with a titanium compound such as liquid titanium tetrahalide to form a solid precipitate in the optional presence of an auxiliary precipitant. A polycarboxylic acid ester may be added before, during or after the precipitation of the solids and loaded on the solid.

The process of solids precipitation can be carried out by at least one of three methods. One method involves mixing a titanium compound such as liquid titanium tetrahalide with magnesium based catalytic support at a temperature in the range of about −40 degrees Celsius to about 0 degrees Celsius, and precipitating the solids while the temperature is raised slowly to a range from about 30 degrees Celsius to about 120 degrees Celsius, such as from about 60 degrees Celsius to about 100 degrees Celsius. The second method involves adding a titanium compound dropwise into a magnesium based catalytic support solution at low or room temperature to precipitate out solids immediately. The third method involves adding a first titanium compound dropwise into a magnesium based catalytic support solution and mixing a second titanium compound with magnesium based catalytic support. In these methods, an internal electron donor can be desirably present in the reaction system. The internal electron donor can be added either after the magnesium based catalytic support solution is obtained or together with magnesium based catalytic support. Alternatively, two or more auxiliary precipitants can be added simultaneously.

The catalyst precursor forms in the following way. In a solvent such as toluene, a homogeneous solution is seen following the addition of a halogenating agent such as $TiCl_4$ at relatively cooler temperatures, such as $-25°$ C. until about $0°$ C. An oil phase is then formed, which can be dispersed into the hydrocarbon phase, that is stable until about $40°$ C. The resultant magnesium material becomes a semi-solid at this point and the particle morphology is now determined. The semi-solid converts to a solid between about $40°$ C. and about $80°$ C.

To facilitate obtaining uniform solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied, the rate of temperature increase can range from about 4 degrees Celsius to about 100 degrees Celsius per hour.

The solid precipitate is first separated from the mixture. In the solid precipitate thus obtained may be entrained a variety of complexes and impurities, so that further treatment may in some instances be necessary. In one embodiment, the solid precipitate is treated with a titanium compound to substantially remove the epoxy compound from the solid precipitate.

The solid precipitate can be washed with an inert diluent and then treated with a titanium compound or a mixture of a titanium compound and an inert diluent. The titanium compound used in this treatment can be identical to or different with the titanium compound used for forming the solid precipitate. The amount of titanium compound used is from about 1 to about 20 moles, such as from about 2 to about 15 moles, per mole of magnesium compound in the support. The treatment temperature ranges from about 50 degrees Celsius to about 150 degrees Celsius, such as from about 60 degrees Celsius to about 100 degrees Celsius. If a mixture of titanium tetrahalide and inert diluent is used to treat the solid precipitate, the volume % of titanium tetrahalide in the treating solution is from about 10% to about 100%, the rest being an inert diluent.

The treated solids can be further washed with an inert diluent to remove ineffective titanium compounds and other impurities. The inert diluent herein used can be hexane, heptane, octane, 1,2-dichloroethane, benzene, toluene, ethylbenzene, xylenes, and other hydrocarbons.

By treating the solid precipitate with the titanium compound and optionally an inert diluent, the epoxy or reaction by product compounds in the solid precipitate can be removed from the solid precipitate as titanium alkoxides. As a result, the resultant solid precipitate does not substantially contain the epoxy or reaction by-product compounds. In one embodiment, the solid precipitate is treated with the titanium compound and optionally an inert diluent about two times or more and five times or less.

By treating the solid precipitate with an inert diluent, a free titanium compound in the solid precipitate can be removed from the solid precipitate. As a result, the resultant solid precipitate does not substantially contain a free titanium compound. In one embodiment, the solid precipitate is treated repeatedly with an inert diluent until the filtrate contains about 100 ppm or less of titanium. In another embodiment, the solid precipitate is treated repeatedly with an inert diluent until the filtrate contains about 50 ppm or less of titanium. In yet another embodiment, the solid precipitate is treated repeatedly with an inert diluent until the filtrate contains about 10 ppm or less of titanium. In one embodiment, the solid precipitate is treated with an inert diluent about three times or more and seven times or less.

The catalyst is washed to remove $TiCl_4$. It is not believed that removal of titanium alkoxy compounds are removed by the washings.

In one embodiment, particularly embodiments following example (2) described above, the solid catalyst component has the following chemical composition: titanium, from about 0.5 to about 6.0 wt %; magnesium, from about 10 to about 2.5 wt %; halogen, from about 40 to about 70 wt %; internal electron donor, from about 1 to about 25 wt %; and optionally inert diluent from about 0 to about 15 wt %.

The amounts of the ingredients used in preparing the solid titanium catalyst component may vary depending upon the method of preparation. In one embodiment, from about 0.01 to about 5 moles of the internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, in the solid titanium catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid titanium catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid titanium catalyst component generally contains a magnesium halide of a smaller crystal size than commercial magnesium halides and usually has a specific surface area of at least about 50 $m^2/g$, such as from about 60 to 1,000 $m^2/g$, or from about 100 to 800 $m^2/g$. Since, the above ingredients are unified to form an integral structure of the solid titanium catalyst component, the composition of the solid titanium catalyst component does not substantially change by washing with, for example, hexane.

The solid titanium catalyst component may be used after being diluted with an inorganic or organic compound such as a silicon compound, an aluminum compound, or the like.

Methods of preparing the active catalyst component, which can be used in the subject innovation so long as the catalyst support made from substantially equal molar amounts of a magnesium compound and an epoxy compound is used, are described in U.S. Patents and U.S. Patent Publications: U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,767,215; 5,773,537; 5,905,050; 6,323,152; 6,437,061; 6,469,112; 6,962,889; 7,135,531; 7,153,803; 7,271,119; 2004242406; 2004/0242407; and 2007/0021573 which are hereby incorporated by reference in this regard.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formulae (II) and (III).

$$R_m^{11}Al(OR^{12})_nH_pX_q^1 \quad (II)$$

In Formula (II), $R^{11}$ and $R^{12}$ may be identical or different, and each represent a hydrocarbon group usually having 1 to about 15 carbon atoms, preferably 1 to about 4 carbon atoms; $X^1$ represents a halogen atom, 0<3, 0≦p<3, 0≦n<3, and m+n+p+q=3.

Organoaluminum compounds further include complex alkylated compounds between aluminum and a metal of Group I represented by Formula (III)

$$M^1AlR_4^{11} \quad (III)$$

wherein $M^1$ represents Li, Na or K, and $R^{11}$ is as defined above.

Examples of the organoaluminum compounds Formula (II) are as follows:

compounds of the general formula $R_m^{11}Al(OR^{12})_{3-m}$ wherein $R^{11}$ and $R^{12}$ are as defined, and m is preferably a number represented by 1.5≦m≦3;

compounds of the general formula $R_m^{11}AlX_{3-m}$ wherein $R^{11}$ is as defined, $X^1$ is halogen, and m is preferably a number represented by 0<m<3;

compounds of the general formula $R_m^{11}AlH_{3-m}$ wherein $R^{11}$ is as defined above, and m is preferably a number represented by 2≦m<3; and compounds represented by the general formula $R_m^{11}Al(OR^{12})_nX_q^1$ wherein $R^{11}$ and $R^{12}$ are as defined, $X^1$ is halogen, 0≦m<3, 0≦n<3, 0≦q<3, m+n+q=3.

Specific examples of the organoaluminum compounds represented by Formula (II) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}{}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula (II) such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$,

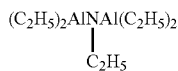

and methylaluminoxane.

Examples of organoaluminum compounds represented by Formula (III) include $LiAl(C_2H_5)_4$ and $LiAl(C_7H_{15})_4$.

The organoaluminum compound catalyst component is used in the catalyst system of the subject innovation in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid titanium catalyst component. This organosilicon compound is sometimes termed an external electron donor. The organosilicon compound contains silicon having at least one hydrocarbon ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a broad molecular weight distribution and controllable crystallinity while retaining high performance with respect to catalytic activity and the yield of highly stereoregular polymer.

The organosilicon compound is used in the catalyst system in an amount that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ratio of the organoaluminum compound to the organosilicon compound is from about 7 to about 35.

In one embodiment, the organosilicon compound is represented by Formula (IV)

 (IV)

wherein R and R' represent a hydrocarbon group, and n is $0 \leq n < 4$. Specific examples of the organosilicon compound of Formula (IV) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyidimethoxysilane, bis-m-tolyldimethoxysilane, bis-p-tolyidimethoxysilane, bis-p-totyidiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

In one embodiment, the organosilicon compound contains in its structure a (cycloalkyl)methylene group, or a derivative of any one of these groups may be used, such as a norpinanes and pinanes. In one embodiment, the organosilicon compound contains one (cycloalkyl)methylene moiety. In another embodiment, the organosilicon compound contains two (cycloalkyl)methylene moieties that are the same or different.

Organosilicon compounds containing at least one (cycloalkyl)methylene moiety can be represented by Formula (V):

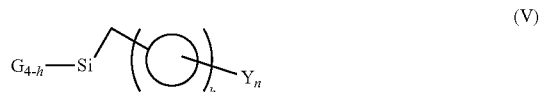 (V)

wherein the circle represents one or more cycloalkyl moieties, each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2. The alkoxy, alkyl, and hydrocarbon groups typically contain 1 to about 8 carbon atoms.

Organosilicon compounds containing at least one (cycloalkyl)methylene moiety can also be represented by one or more of Formulae (VI), (VII), (VIII), (IX), and (X):

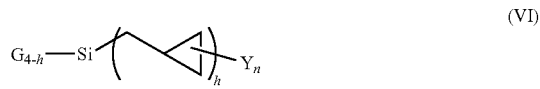 (VI)

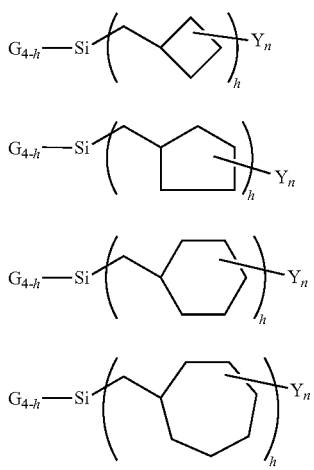

(VII)

(VIII)

(IX)

(X)

wherein each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2.

Additional examples of organosilicon compounds are those of the following Formulae (XI), (XII), (XIII), (XIV), (XV), (XVI), (XVII), (XVIII), (XIX), (XX), (XXI), and (XXII):

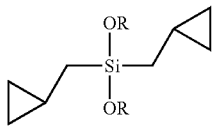

(XI)

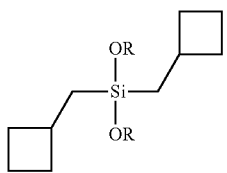

(XII)

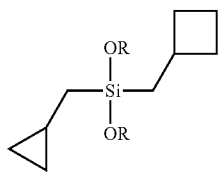

(XIII)

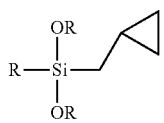

(XIV)

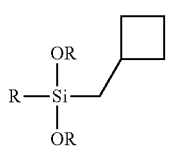

(XV)

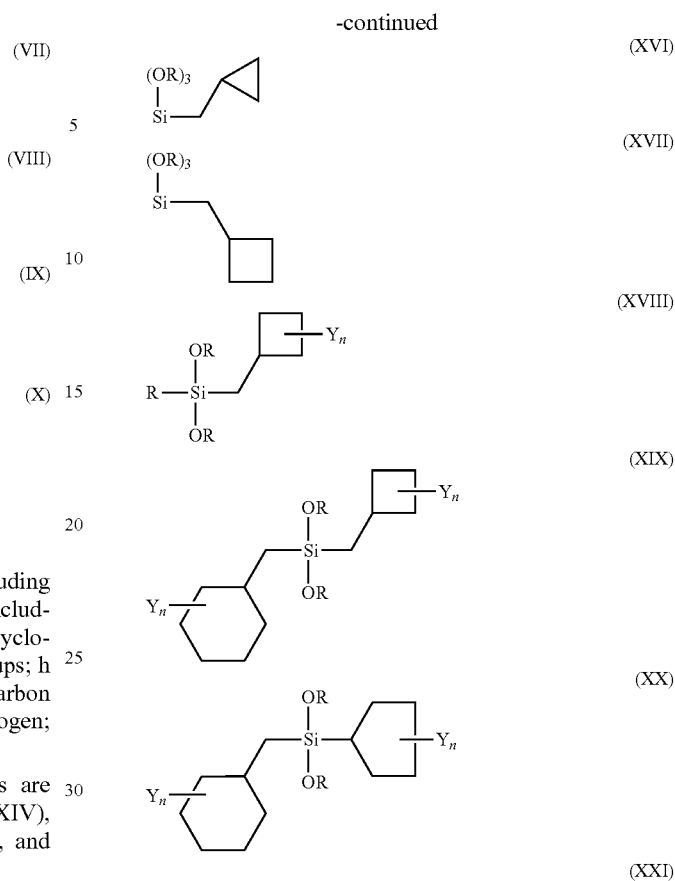

(XVI)

(XVII)

(XVIII)

(XIX)

(XX)

(XXI)

(XXII)

wherein each R is independently a hydrocarbon group including alkyl groups, such as methyl, ethyl, propyl, butyl, cyclopropyl, cyclopentyl, cyclohexyl, and 2-ethylhexyl groups; each Y is independently a hydrocarbon group including those mentioned above, hydroxy, or halogen; and n is 0 to 3, 0 to 2, or 1 to 2.

Although not shown in Formulae (XI) to (XVII), substituent Y may be optionally present in these formulae on any of the (cycloalkyl)methylene groups. For example, one or more Y groups may be present on the (cyclopropyl)methylene group of Formula (XVI).

Examples of organosilicon compounds containing in its structure a (cycloalkyl)methylene group, or a derivative of any one of these groups include bis{(cyclobutyl) methylene}dimethoxysilane, bis{(cyclopropyl) methylene}dimethoxysilane, bis{(cyclopentyl) methylene}dimethoxysilane, bis{(cyclohexyl)

methylene}dimethoxysilane, bis{(cycloheptyl)methylene}dimethoxysilane, (cyclobutyl)methylene (cyclopropyl)methylene dimethoxysilane, (cyclopentyl)methylene (cyclopropyl)methylene dimethoxysilane, (cyclohexyl)methylene (cyclopropyl)methylene dimethoxysilane, (cycloheptyl)methylene (cyclopropyl)methylene dimethoxysilane, (cyclobutyl)methylene (cyclopentyl)methylene dimethoxysilane, (cyclobutyl)methylene (cyclohexyl)methylene dimethoxysilane, (cyclobutyl)methylene (cycloheptyl)methylene dimethoxysilane, (cyclopentyl)methylene (cyclohexyl)methylene dimethoxysilane, (cyclopentyl)methylene (cycloheptyl)methylene dimethoxysilane, (cyclohexyl)methylene (cycloheptyl)methylene dimethoxysilane, (cyclobutyl)methylene cyclobutyl dimethoxysilane, (cyclobutyl)methylene methyl dimethoxysilane, (cyclopropyl)methylene methyl dimethoxysilane, (cyclopropyl)methylene isopropyl dimethoxysilane, (cyclopropyl)methylene butyl dimethoxysilane, (cyclopropyl)methylene cyclopentyl dimethoxysilane, (cyclopropyl)methylene cyclohexyl dimethoxysilane, (cyclopropyl)methylene 2-ethylhexyl dimethoxysilane, (cyclobutyl)methylene methyl dimethoxysilane, (cyclobutyl)methylene isopropyl dimethoxysilane, (cyclobutyl)methylene butyl dimethoxysilane, (cyclobutyl)methylene cyclopentyl dimethoxysilane, (cyclobutyl)methylene cyclohexyl dimethoxysilane, (cyclobutyl)methylene 2-ethylhexyl dimethoxysilane, (cyclopentyl)methylene cyclobutyl dimethoxysilane, (cyclopentyl)methylene methyl dimethoxysilane, (cyclohexyl)methylene methyl dimethoxysilane, (cyclohexyl)methylene isopropyl dimethoxysilane, (cyclohexyl)methylene butyl dimethoxysilane, (cyclohexyl)methylene cyclopentyl dimethoxysilane, (cyclohexyl)methylene cyclohexyl dimethoxysilane, (cyclohexyl)methylene 2-ethylhexyl dimethoxysilane, (cyclopentyl)methylene methyl dimethoxysilane, (cyclopentyl)methylene isopropyl dimethoxysilane, (cyclopentyl)methylene butyl dimethoxysilane, (cyclopentyl)methylene cyclopentyl dimethoxysilane, (cyclopentyl)methylene cyclohexyl dimethoxysilane, (cyclopentyl)methylene 2-ethylhexyl dimethoxysilane, (cycloheptyl)methylene cyclobutyl dimethoxysilane, (cycloheptyl)methylene methyl dimethoxysilane, (cycloheptyl)methylene methyl dimethoxysilane, (cycloheptyl)methylene isopropyl dimethoxysilane, (cycloheptyl)methylene butyl dimethoxysilane, (cycloheptyl)methylene cyclopentyl dimethoxysilane, (cycloheptyl)methylene cyclohexyl dimethoxysilane, (cycloheptyl)methylene 2-ethylhexyl dimethoxysilane, (cyclopropyl)methylene trimethoxysilane, (cyclobutyl)methylene trimethoxysilane, (cyclopentyl)methylene trimethoxysilane, (cyclohexyl)methylene trimethoxysilane, (cycloheptyl)methylene trimethoxysilane, bis{(cyclobutyl)methylene}diethoxysilane, bis{(cyclopropyl)methylene}diethoxysilane, bis{(cyclopentyl)methylene}diethoxysilane, bis{(cyclohexyl)methylene}diethoxysilane, bis{(cycloheptyl)methylene}diethoxysilane, (cyclobutyl)methylene (cyclopropyl)methylene diethoxysilane, (cyclopentyl)methylene (cyclopropyl)methylene diethoxysilane, (cyclohexyl)methylene (cyclopropyl)methylene diethoxysilane, (cycloheptyl)methylene (cyclopropyl)methylene diethoxysilane, (cyclobutyl)methylene (cyclopentyl)methylene diethoxysilane, (cyclobutyl)methylene (cyclohexyl)methylene diethoxysilane, (cyclobutyl)methylene (cycloheptyl)methylene diethoxysilane, (cyclopentyl)methylene (cyclohexyl)methylene diethoxysilane, (cyclopentyl)methylene (cycloheptyl)methylene diethoxysilane, (cyclohexyl)methylene (cycloheptyl)methylene diethoxysilane, (cyclobutyl)methylene cyclobutyl diethoxysilane, (cyclobutyl)methylene methyl diethoxysilane, (cyclopropyl)methylene methyl diethoxysilane, (cyclopropyl)methylene isopropyl diethoxysilane, (cyclopropyl)methylene butyl diethoxysilane, (cyclopropyl)methylene cyclopentyl diethoxysilane, (cyclopropyl)methylene cyclohexyl diethoxysilane, (cyclopropyl)methylene 2-ethylhexyl diethoxysilane, (cyclobutyl)methylene methyl diethoxysilane, (cyclobutyl)methylene isopropyl diethoxysilane, (cyclobutyl)methylene butyl diethoxysilane, (cyclobutyl)methylene cyclopentyl diethoxysilane, (cyclobutyl)methylene cyclohexyl diethoxysilane, (cyclobutyl)methylene 2-ethylhexyl diethoxysilane, (cyclopentyl)methylene cyclobutyl diethoxysilane, (cyclopentyl)methylene methyl diethoxysilane, (cyclohexyl)methylene methyl diethoxysilane, (cyclohexyl)methylene isopropyl diethoxysilane, (cyclohexyl)methylene butyl diethoxysilane, (cyclohexyl)methylene cyclopentyl diethoxysilane, (cyclohexyl)methylene cyclohexyl diethoxysilane, (cyclohexyl)methylene 2-ethylhexyl diethoxysilane, (cyclopentyl)methylene methyl diethoxysilane, (cyclopentyl)methylene isopropyl diethoxysilane, (cyclopentyl)methylene butyl diethoxysilane, (cyclopentyl)methylene cyclopentyl diethoxysilane, (cyclopentyl)methylene cyclohexyl diethoxysilane, (cyclopentyl)methylene 2-ethylhexyl diethoxysilane, (cycloheptyl)methylene cyclobutyl diethoxysilane, (cycloheptyl)methylene methyl diethoxysilane, (cycloheptyl)methylene methyl diethoxysilane, (cycloheptyl)methylene isopropyl diethoxysilane, (cycloheptyl)methylene butyl diethoxysilane, (cycloheptyl)methylene cyclopentyl diethoxysilane, (cycloheptyl)methylene cyclohexyl diethoxysilane, (cycloheptyl)methylene 2-ethylhexyl diethoxysilane, (cyclopropyl)methylene triethoxysilane, (cyclobutyl)methylene triethoxysilane, (cyclopentyl)methylene triethoxysilane, (cyclohexyl)methylene triethoxysilane, and (cycloheptyl)methylene triethoxysilane.

In another aspect of the subject innovation, the organosilicon compound is represented by Formula (XXIV)

$$SiR^{21}R_m^{22}(OR^{23})_{3-m} \quad (XXIV)$$

In the above Formula (XXIV), $0 \leq m < 3$, such as $0 \leq m \leq 2$; and $R^{21}$ represents a cyclopropyl group, cyclobutyl group, cyclopentyl group, a cyclopentenyl group, a cyclopentadienyl group, cyclohexyl group, or a derivative of any of these. The derivative may preferably be, for example, a cyclopentyl group substituted by 1 to about 4 alkyl groups having 1 to about 4 carbon atoms, an alkyl group having 2 to about 4 carbon atoms substituted by a cyclopentyl group which may be substituted by 1 to about 4 alkyl groups having 1 to about 4 carbon atoms, a cyclopentenyl group substituted by 1 to about 4 alkyl groups having 1 to about 4 carbon atoms, a cyclopentadienyl group substituted by 1 to about 4 alkyl groups having 1 to about 4 carbon atoms, or an indenyl, indanyl, tetrahydroindenyl or fluorenyl group which may be substituted by 1 to about 4 alkyl groups having 1 to about 4 carbon atoms.

Specific examples of the group $R^{21}$ include cyclopropyl, cyclobutyl, cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tertiary butyl cyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl, 1-methyl-1-cyclopentylethyl, cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-dimethyl-3-cyclopentenyl, 2,3,4,5-tetramethyl-3-cyclopentenyl, 2,2,5,5-tetramethyl-3-cyclopentenyl, 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2-dimethyl-2,4-cyclopentadienyl, 2,3-dimethyl-2,4-cyclopentadienyl, 2,5-dimethyl-2,4-cyclopentadienyl, 2,3,4,5-tetramethyl-2,4-cyclopentadienyl, indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl, fluorenyl groups, cyclohexyl, methylcyclohexyls, ethylcyclohexyls, propylcyclohexyls, isopropylcyclohexyls, n-butylcyclohexyls, tertiary-butyl cyclohexyls, dimethylcyclohexyls, and trimethylcyclohexyls.

In Formula (XXIV), $R^{22}$ and $R^{23}$ are identical or different and each represents a hydrocarbon. Examples of $R^{22}$ and $R^{23}$ are alkyl, cycloalkyl, aryl and aralkyl groups having 3 or more carbon atoms. Furthermore, $R^{21}$ and $R^{22}$ may be bridged by an alkyl group, etc. General examples of organosilicon compounds are those of Formula (XXIV) in which $R^{21}$ is a cyclopentyl group, $R^{22}$ is an alkyl group such as methyl or a cyclopentyl group, and $R^{23}$ is an alkyl group, particularly a methyl or ethyl group.

Specific examples of organosilicon compounds of Formula (XXIV) include trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl) dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyidimethoxysilane, di(3-cyclopentenyl)dimethoxysilane, bis(2,5-dimethyl-3-cyclopentenyl)dimethoxysilane, di-2,4-cyclopentadienyidimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyidimethoxysilane, diindenyidimethoxysilane, bis(1,3-dimethyl-2-indenyl)dimethoxysilane, cyclopentadienylindenyidimethoxysilane, difluorenyldimethoxysilane, cyclopentylfluorenyldimethoxysilane and indenylfluorenyidimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and ethylenebis-cyclopentyldimethoxysilane.

In yet another aspect of the subject innovation, the organosilicon compound is a polyorganosilicon compound containing, as a monomer, any of the organosilicon compounds described above.

Polymerization of olefins in accordance with the subject innovation is carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid titanium catalyst component is usually employed in combination with at least a portion of the organoaluminum compound. This may be carried out in the presence of part or the whole of the organosilicon compound (external electron donor). The concentration of the catalyst system used in the preliminary polymerization may be much higher than that in the reaction system of the main polymerization.

In preliminary polymerization, the concentration of the solid titanium catalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and reacting the olefin under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the subject innovation, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20 degrees Celsius to about 100 degrees Celsius. In another embodiment, the temperature is from about −10 degrees Celsius to about 80 degrees Celsius. In yet another embodiment, the temperature is from about 0 degrees Celsius to about 40 degrees Celsius.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135 degrees Celsius, of at least about 0.2 dl/g, and preferably from about 0.5 to 10 dl/g.

In one embodiment, the preliminary polymerization is desirably carried out so that from about 0.1 g to about 1,000 g of a polymer forms per gram of the titanium catalyst component of the catalyst system. In another embodiment, the preliminary polymerization is desirably carried out so that from about 0.3 g to about 500 g of a polymer forms per gram of the titanium catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid titanium catalyst component, the organoaluminum compound and the organosilicon compound (external electron donor).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the subject innovation, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics while in the case of gas phase polymerization, the catalyst bed attains excellent characteristics. Furthermore, in these embodiments, a polymer having a high stereoregularity index can be produced with a high catalytic efficiency by polymerizing an alpha-olefin having at least about 3 carbon atoms. Accordingly, when producing the propylene copolymer, the resulting copolymer powder or the copolymer becomes easy to handle.

In the homopolymerization or copolymerization of these olefins, a polyunsaturated compound such as a conjugated diene or a non-conjugated diene may be used as a comonomer. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates. In one embodiment, the comonomers include thermoplastic and elastomeric monomers.

In the process of the subject innovation, the main polymerization of an olefin is carried out usually in the gaseous or liquid phase.

In one embodiment, polymerization (main polymerization) employs a catalyst system containing the titanium catalyst component in an amount from about 0.001 to about 0.75 millimole calculated as Ti atom per liter of the volume of the polymerization zone, the organoaluminum compound in an amount from about 1 to about 2,000 moles per mole of titanium atoms in the titanium catalyst component, and the organosilicon compound (external donor) in an amount from about 0.001 to about 10 moles calculated as Si atoms in the organosilicon compound per mol of the metal atoms in the organoaluminum compound. In another embodiment, polymerization employs a catalyst system containing the titanium catalyst component in an amount from about 0.005 to about 0.5 millimole calculated as Ti atom per liter of the volume of the polymerization zone, the organoaluminum compound in an amount from about 5 to about 500 moles per mole of titanium atoms in the titanium catalyst component, and the organosilicon compound in an amount from about 0.01 to about 2 moles calculated as Si atoms in the organosilicon compound per mol of the metal atoms in the organoaluminum compound. In yet another embodiment, polymerization employs a catalyst system containing the organosilicon compound in an amount from about 0.05 to about 1 mole calculated as Si atoms in the organosilicon compound per mol of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are increased according to the methods of the subject innovation.

In one embodiment, the polymerization temperature is from about 20 degrees Celsius to about 200 degrees Celsius. In another embodiment, the polymerization temperature is from about 50 degrees Celsius to about 180 degrees Celsius. In one embodiment, the polymerization pressure is typically from about atmospheric pressure to about 100 kg/cm². In another embodiment, the polymerization pressure is typically from about 2 kg/cm² to about 50 kg/cm². The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubbers (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from this resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact copolymer.

The alpha-olefin having 2 carbon atoms is ethylene, and examples of the alpha-olefins having about 4 to about 20 carbon atoms are 1-butene, 1-pentene, 4-methyl-1-pentene, 1-octene, 1-hexene, 3-methyl-1-pentene, 3-methyl-1-butene, 1-tetradecene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. In the subject innovation, this first stage polymerization may, as required be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another one embodiment, copolymers made with the catalyst system contain from about 50% to about 99% by weight poly-alpha-olefins and from about 1% to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiments are applicable.

The catalysts/methods of the subject innovation can in some instances lead to the production of poly-alpha-olefins having xylene solubles (XS) from about 0.5% to about 10%. In another embodiment, poly-alpha-olefins having xylene solubles (XS) from about 1% to about 6% are produced in accordance with the subject innovation. In yet another embodiment, poly-alpha-olefins having xylene solubles (XS) from about 1.5% to about 5% are produced in accordance with the subject innovation. XS refers to the percent of solid polymer that dissolves into xylene. A low XS % value generally corresponds to a highly isotactic polymer (i.e., higher crystallinity), whereas a high XS % value generally corresponds to a low isotactic polymer.

In one embodiment, the catalyst efficiency (measured as kilogram of polymer produced per gram of catalyst) of the catalyst system of the subject innovation is at least about 20. In another embodiment, the catalyst efficiency of the catalyst system of the subject innovation is at least about 30. In yet another embodiment, the catalyst efficiency of the catalyst system of the subject innovation is at least about 35. In still yet another embodiment, the catalyst efficiency of the catalyst system of the subject innovation is at least about 40.

The catalysts/methods of the subject innovation can in some instances lead to the production of poly-alpha-olefins having melt flow indexes (MFI) from about 3 to about 9. The MFI (flow rate) is measured according to ASTM standard D 1238. In another embodiment, poly-alpha-olefins having an MFI from about 4 to about 8 are produced in accordance with the subject innovation. In yet another embodiment, poly-alpha-olefins having an MFI from about 5 to about 7 are produced in accordance with the subject innovation. In one embodiment, an impact polypropylene-ethylenepropylene rubber product has an MFI from about 4 to about 8. In another embodiment, an impact polypropylene-ethylenepropylene rubber product has an MFI from about 5 to about 7. In some instances a relatively high MFI indicates that a relatively high catalyst efficiency is obtainable.

The catalysts/methods of the subject innovation can in some instances lead to the production of poly-alpha-olefins having bulk densities (BD) of at least about 0.3 cc/g. In another embodiment, poly-alpha-olefins having a BD of at least about 0.33 cc/g are produced in accordance with the subject innovation. In yet another embodiment, poly-alpha-olefins having a BD of at least about 0.36 cc/g are produced in accordance with the subject innovation. In still yet another embodiment, poly-alpha-olefins having a BD of at least about 0.4 cc/g are produced in accordance with the subject innovation.

In one embodiment, an impact polypropylene-ethylenepropylene rubber product having a BD of at least about 0.3 cc/g is produced in accordance with the subject innovation. In another embodiment, an impact polypropylene-ethylenepropylene rubber product having a BD of at least about 0.33 cc/g is produced in accordance with the subject innovation. In yet another embodiment, an impact polypropylene-ethylenepropylene rubber product having a BD of at least about 0.6 cc/g is produced in accordance with the subject innovation. In still yet another embodiment, an impact polypropylene-ethylenepropylene rubber product having a BD of at least about 0.4 cc/g is produced in accordance with the subject innovation.

The catalysts/methods of the subject innovation lead to the production of poly-alpha-olefins having a relatively narrow molecular weight distribution. In one embodiment, the Mw/Mn of a polypropylene polymer made with a catalyst system containing a catalyst support made by contacting substantially equal molar amounts of a magnesium compound and an epoxy compound is from about 2 to about 6. In another embodiment, the Mw/Mn of a polypropylene polymer made with a catalyst system containing a catalyst support made by contacting substantially equal molar amounts of a magnesium compound and an epoxy compound is from about 3 to about 5.

According to this innovation, the amount of the by-product hydrocarbon-soluble copolymer can be reduced. Since the amount of the copolymer yielded per unit amount of titanium is large, an operation of removing the catalyst after the polymerization can be omitted.

The subject innovation can lead to the production of a propylene block copolymer and impact copolymers including polypropylene based impact copolymers having one or more of excellent melt-flowability, moldability, desirable balance between rigidity and elasticity, good stereospecific control, good control over size, shape, size distribution, and molecular weight distribution, impact strength and impact strength with a high catalytic efficiency and/or good operability. Employing the catalyst systems containing a catalyst support made by contacting substantially equal molar amounts of a magnesium compound and an epoxy compound according to the subject innovation yields catalysts simultaneously having high catalytic efficiency and one or more of excellent melt-flowability, extrudability, moldability, rigidity-elasticity, impact strength and impact strength.

Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle that can polymerize olefins. Examples of reactors 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
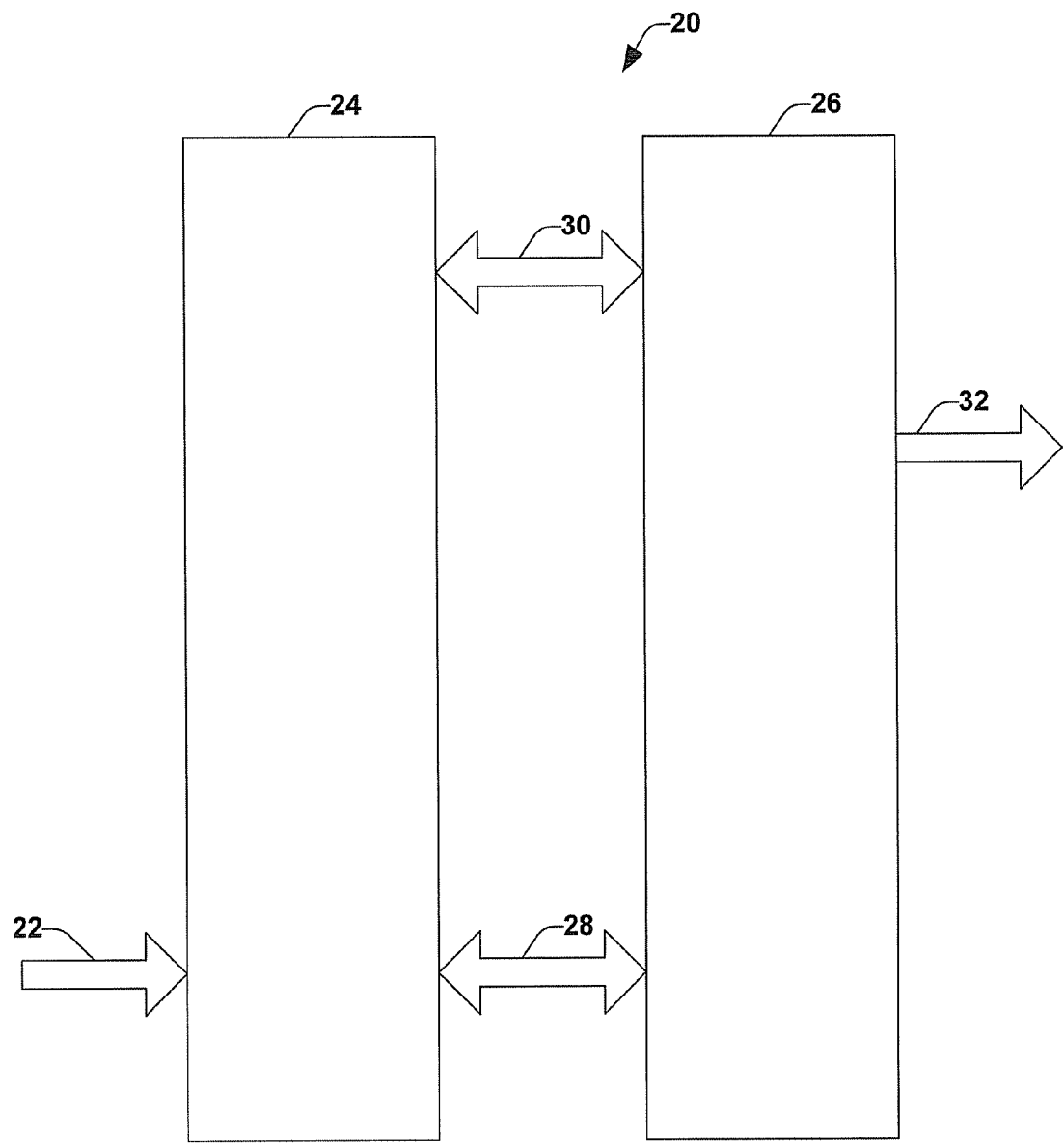
FIG. 2 is a schematic diagram of an olefin polymerization reactor in accordance with one aspect of the subject innovation.
Figure 3:
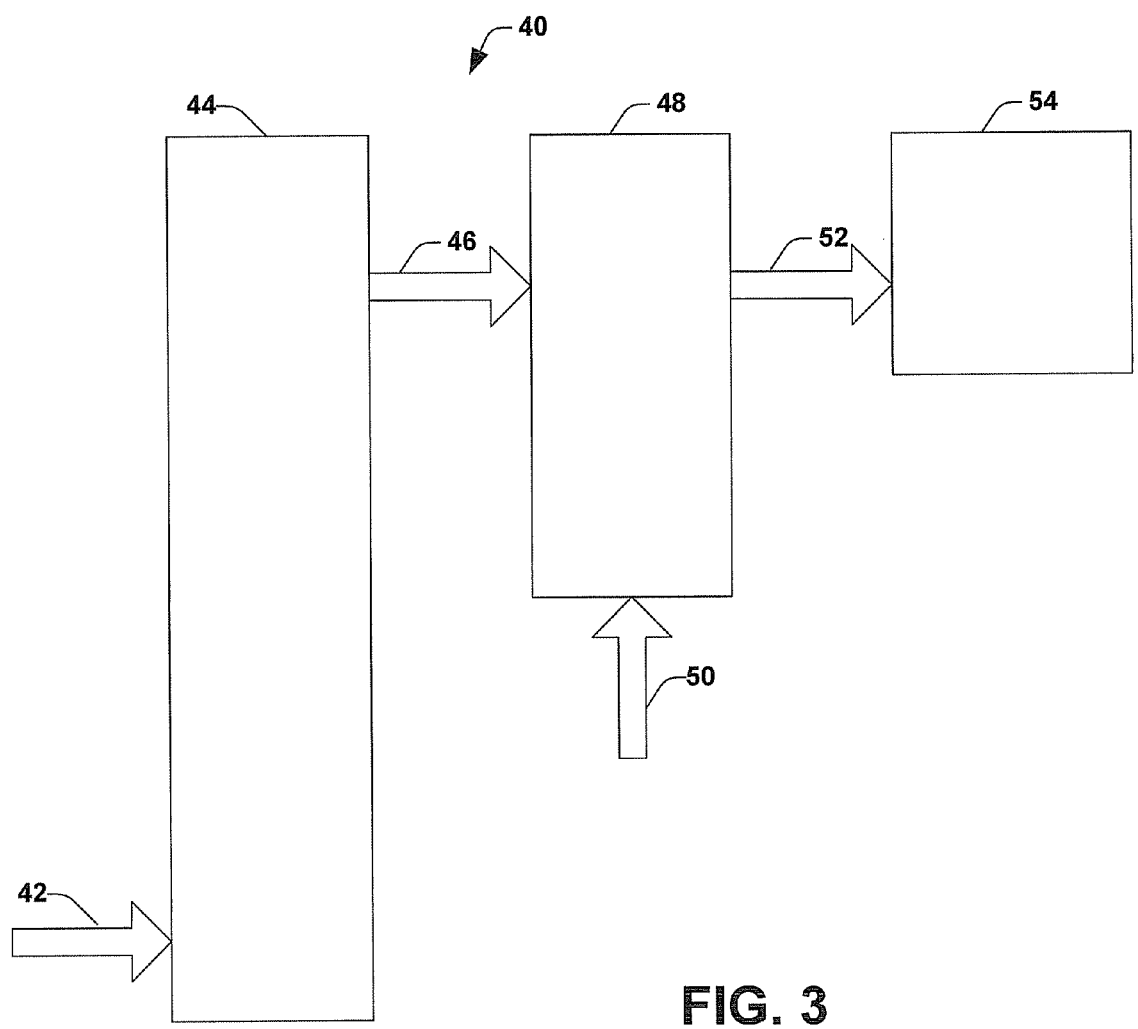
FIG. 3 is a high level schematic diagram of a system for making impact copolymer in accordance with one aspect of the subject innovation.

Referring to FIG. 2, a schematic diagram of a multizone circulating reactor 20 that can be employed as the reactor 14 in FIG. 1 or reactor 44 in FIG. 3 for making polyolefins. The multizone circulating reactor 20 substitutes a series of separate reactors with a single reactor loop that permits different gas phase polymerization conditions in the two sides due to use of a liquid barrier. In the multizone circulating reactor 20, a first zone starts out rich in olefin monomer, and optionally one or more comonomers. A second zone is rich in hydrogen gas, and a high velocity gas flow divides the growing resin particles out loosely. The two zones produce resins of different molecular weight and/or monomer composition. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst systems described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact copolymer. A reactor 44, such as a single reactor, a series of reactors, or the multizone circulating reactor is paired with a gas phase or fluidized bed reactor 48 downstream containing the catalyst systems described above to make impact copolymers with desirable impact to stiffness balance or greater softness than are made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 and second reactor 48 contains catalyst systems in accordance with the innovation.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The following examples illustrate the subject innovation. Unless otherwise indicated in the following examples and elsewhere in the specification and claims, all parts and percentages are by weight, all temperatures are in degrees Centigrade, and pressure is at or near atmospheric pressure.

EXAMPLE 1

Preparation of a Solid Titanium Catalyst Component

Anhydrous magnesium chloride (228 lbs, 1,086 mol), toluene (2,000 lbs), epoxy chloropropane (224 lbs, 1096 mol) and tributyl phosphate (580 lbs, 989 mol) are introduced into a reactor which has thoroughly been purged with highly purified nitrogen. The temperature is raised to 50 degrees Celsius with stirring, and the mixture is then maintained at this temperature for 2 hours, while the solids dissolve completely. Phthalic anhydride (83 lbs, 254 mol) is added to the solution, and then the solution is maintained for an additional 1 hour at 50 degrees Celsius. Toluene (1,750 lbs) is added to the solution. The solution is cooled to −25 degrees Celsius. Titanium tetrachloride (4,500 lbs, 10,761 mol) is added to maintain temperature at or below −25° C., about 4 hours. The solution is heated to 80 degrees Celsius over the course of 3 hours, while a solid product precipitates. Diisobutyl Phthalate (DIBP, 86 lbs, 140 mol) is added and the mixture is maintained at the temperature of 80 degrees Celsius for 1 hour.

The solid portion is collected by filtration and washed with toluene (2×3,600 lbs). A brown-yellow solid precipitate is obtained. The solid is then treated with a mixture of toluene (3,600 lbs) and titanium tetrachloride (777 lbs) for 1 hour at 105 degrees Celsius. After the filtrate is removed, the treatment is repeated three times with the temperature increased to 110° C. and the time reduced to 30 minutes. The solid is washed with hexane (5×1,200 lbs). The final filtrate contains less than 100 ppm of titanium.

EXAMPLE 2

Preparation of a Solid Titanium Catalyst Component

Example 1 is repeated but 2,018 lbs of toluene is added instead of 1,750 lbs of toluene after adding phthalic anhydride to the solution and maintaining the solution for 1 hour at 50 degrees Celsius.

EXAMPLE 3

Preparation of a Solid Titanium Catalyst Component

Example 1 is repeated but 1,911 lbs of toluene is added instead of 1,750 lbs of toluene after adding phthalic anhydride to the solution and maintaining the solution for 1 hour at 50 degrees Celsius.

EXAMPLE 4

Preparation of a Solid Titanium Catalyst Component

Example 1 is repeated but 1,800 lbs of toluene is added instead of 1,750 lbs of toluene after adding phthalic anhydride to the solution and maintaining the solution for 1 hour at 50 degrees Celsius.

EXAMPLE 5

Preparation of a Solid Titanium Catalyst Component

Example 1 is repeated but 1,800 lbs of toluene is added instead of 1,750 lbs of toluene after adding phthalic anhydride to the solution and maintaining the solution for 1 hour at 50 degrees Celsius.

The catalyst supports of Examples 1-5 are described in Table 1. D50 refers to an average diameter of particles on a 50% by volume basis as determined by a Malvern Instrument.

TABLE 1

| Example | Ti wt % | Mg wt % | DIBP wt % | D50 μm | Morphology |
|---------|---------|---------|-----------|--------|------------|
| 1 | 1.52 | 18.57 | 12.27 | 16 | substantially spherical |
| 2 | 2.00 | 18.06 | 14.91 | 27 | substantially spherical |
| 3 | 1.57 | 19.85 | 12.60 | 17 | substantially spherical |
| 4 | 1.40 | 19.04 | 12.55 | 22 | substantially spherical |
| 5 | 1.36 | 18.93 | 11.35 | 34 | substantially spherical |

EXAMPLES 6-10

Solution Polymerization

The five catalyst supports of Examples 1-5 are used to form catalysts and polymerize polypropylene, and the five experiments are designated as Examples 6-10, respectively. Triethyl aluminum (1.5 cc at 25 wt %), cyclohexylmethyldimethoxysilane (1.0 cc, I 76.8 mmol) and 10 mm of the solid catalyst component dispersed into 1 cc mineral oil are introduced into a 3.4-liter stainless steel autoclave, which was thoroughly purged with nitrogen. The autoclave is pressurized to 10 psi with nitrogen and 32 mmol of hydrogen. The autoclave is then filled with 1500 ml liquid propylene and the temperature is raised to 70 degrees Celsius. The temperature is maintained at 70 degrees Celsius. Propylene is polymerized for 2 hours. At the end of polymerization, the reactor is cooled down to 35° C. and the polymer removed.

The characteristics of polymer products and processes are summarized in Table 2. CE refers to catalytic efficiency to produce polypropylene (PP), XS refers to xylene solubles, BD refers to bulk density, and D50 refers to an average diameter of polymer product on a 50% by volume basis as determined by a Malvern Instrument.

TABLE 2

| Example | CE kg PP/g catalyst | XS wt % | BD g/ml | D50 μm |
|---------|---------------------|---------|---------|--------|
| 6 | 43.2 | 1.9 | 0.47 | 550 |
| 7 | 41.4 | 2.1 | 0.4 | 1,088 |
| 8 | 38.3 | 1.8 | 0.47 | 605 |
| 9 | 36.2 | 2.1 | 0.47 | 721 |
| 10 | 40.4 | 1.9 | 0.44 | 1,057 |

What has been described above includes examples of the disclosed information. It is, of course, not possible to describe every conceivable combination of components or methodologies for purposes of describing the disclosed information, but one of ordinary skill in the art can recognize that many further combinations and permutations of the disclosed information are possible. Accordingly, the disclosed information is intended to embrace all such alterations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

What is claimed is:

1. A catalyst system for use in olefinic polymerization to form a resultant polymer product, comprising:
a solid titanium catalyst component having a substantially spherical shape and a diameter from about 5 microns to about 90 microns on a 50% by volume basis and a degree of sphericalness of 0.9 or more, the solid titanium catalyst component comprising a titanium compound and a support made by contacting substantially equal molar amounts of a magnesium compound and an epoxy compound with an aprotic solvent and a surfactant selected from one or more of the group consisting of polymer surfactants, non-ionic surfactants and anionic surfactants, the magnesium compound and the epoxy compound contacted in an organic medium to form an intermediate, the organic medium comprising an organic solvent capable of forming an emulsion with the intermediate, followed by contacting the intermediate with a halogenating agent
an organoaluminum compound having at least one aluminum-carbon bond; and an organosilicon compound,
wherein the support has a size span from about 0.7 to about 1.1, and the resultant polymer product produced by the catalyst system has an average diameter of about 500 microns or more on a 50% by volume basis.

2. The catalyst system of claim 1, wherein a molar ratio of magnesium compound to epoxy compound is from about 1:0.75 to about 1:1.25.

3. The catalyst system of claim 1, wherein a molar ratio of magnesium compound to epoxy compound is from about 1:0.8 to about 1:1.2.

4. The catalyst system of claim 1, wherein a molar ratio of magnesium compound to epoxy compound is from about 1:0.9 to about 1:1.1.

5. The catalyst system of claim 1, wherein a molar ratio of magnesium compound to epoxy compound is from about 1:0.95 to about 1:1.05 and a molar ratio of magnesium compound to aprotic solvent is from about 1:0.85 to about 1:1.

6. The catalyst system of claim 1, wherein the magnesium compound and the epoxy compound are contacted in the presence of a titanium compound and/or an internal electron donor.

7. The catalyst system of claim 1, wherein the solid titanium catalyst component does not substantially contain the epoxy compound.

8. The catalyst system of claim 1, wherein the magnesium compound comprises at least one selected from the group consisting of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethylhexoxy magnesium, phenoxy magnesium, dimethylphenoxy magnesium, magnesium laurate, and magnesium stearate; and wherein the halogenating agent comprises at least one selected from the group consisting of titanium tetrahalides, alkoxytitanium trihalides, dialkoxytitanium dihalides, trialkoxytitanium monohalides, and tetraalkoxytitaniums.

9. The catalyst system of claim 1, wherein the epoxy compound comprises at least one selected from the group consisting of aliphatic epoxy compounds, alicyclic epoxy compounds, and aromatic epoxy compounds.

10. The catalyst system of claim 1, wherein the epoxy compound comprises at least one selected from the group consisting of halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, and aromatic epoxy compounds having a cyano group.

11. The catalyst system of claim 1, wherein the epoxy compound comprises at least one selected from the group consisting of ethylene oxide, propylene oxide, 1,2-epoxybutane, 2,3-epoxybutane, 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, 7,8-epoxy-2-methyloctadecane, 2-vinyl oxirane, 2-methyl-2-vinyloxirane, 1,2-epoxy-5-hexene, 1,2-epoxy-7-octene, 1-phenyl-2,3-epoxypropane, 1-(1-naphthyl)-2,3-epoxypropane, 1-cyclohexyl-3,4-epoxybutane, 1,3-butadiene dioxide, 1,2,7,8-diepoxyoctane, cyclopentene oxide, 3-methyl-1,2-cyclopentene oxide, cyclohexene oxide, cyclooctene oxide, alpha-pinene oxide, 2,3-epoxynorbornane, limonene oxide, cyclododecane epoxide, 2,3,5,6-diepoxynorbornane, styrene oxide, 3-methylstyrene oxide, 1,2-epoxybutylbenzene, 1,2-epoxyoctylbenzene, stilbene oxide, 3-vinyistyrene oxide, 1-(1-methyl-1,2-epoxyethyl)-3-(1-methylvinyl)benzene, 1,4-bis(1,2-epoxypropyl)benzene, 1,3-bis(1,2-epoxy-1-methylethyl)benzene, 1,4-bis(1,2-epoxy-1-methylethyl)benzene, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, 1-(2,3-epoxypropyl)-4-chlorobenzene, 1-(3,4-epoxybutyl)-3-chlorobenzene, 4-fluoro-1,2-cyclohexene oxide, 6-chloro-2,3-epoxybicyclo[2.2.1]heptane, 4-fluorostyrene oxide, 1-(1,2-epoxypropyl)-3-trifluorobenzene, 3-acetyl-1,2-epoxypropane, 4-benzoyl-1,2-epoxybutane, 4-(4-benzoyl)phenyl-1,2-epoxybutane, 4,4'-bis(3,4-epoxybutyl)benzophenone, 3,4-epoxy-1-cyclohexanone, 2,3-epoxy-5-oxobicyclo[2.2.1]heptane, 3-acetylstyrene oxide, 4-(1,2-epoxypropyl)benzophenone, glycidyl methyl ether, butyl glycidyl ether, 2-ethylhexyl glycidyl ether, allyl glycidyl ether, ethyl 3,4-epoxybutyl ether, glycidyl phenyl ether, glycidyl 4-tert-butylphenyl ether, glycidyl 4-chlorophenyl ether, glycidyl 4-methoxyphenyl ether, glycidyl 2-phenylphenyl ether, glycidyl 1-naphthyl ether, glycidyl 4-indolyl ether, glycidyl N-methyl-alpha-quinolon-4-yl ether, ethyleneglycol diglycidyl ether, 1,4-butanediol diglycidyl ether, 1,2-diglycidyloxybenzene, 2,2-bis(4-glycidyloxyphenyl)propane, tris(4-glycidyloxyphenyl)methane, poly(oxypropylene)triol triglycidyl ether, a glycidyl ether of phenol novolac, 1,2-epoxy-4-methoxycyclohexane, 2,3-epoxy-5,6-dimethoxybicyclo[2.2.1]heptane, 4-methoxystyrepe oxide, 1-(1,2-epoxybutyl)-2-phenoxybenzene, glycidyl formate, glycidyl acetate, 2,3-epoxybutyl acetate, glycidyl butyrate, glycidyl benzoate, diglycidyl terephthalate, poly(glycidyl acrylate), poly(glycidyl methacrylate), 1,2-epoxy-4-methoxycarbonylcyclohexane, 2,3-epoxy-5-butoxycarbonylbicyclo[2.2.1]heptane, ethyl 4-(1,2-epoxyethy)benzoate, methyl 3-(1,2-epoxybutyl)benzoate, methyl 3(1,2-epoxybutyl)-5-phenylbenzoate, N,N-glycidylmethylacetamide, N,N -ethylglycidylpropionamide, N,N-glycidylmethylbenzamide, N-(4,5-epoxypentyl)-N -methylbenzamide, N,N-diglycidylaniline, bis(4-diglycidylaminophenyl)methane, poly(N,N-glycidylmethylacrylamide), 1,2-epoxy-3-(diphenylcarbamoyl)cyclohexane, 2,3-epoxy-6-(dimethylcarbamoy)bicyclo[2.2.1]heptane, 2-(dimethylcarbamoyl)styrene oxide, 4-(1,2-epoxybutyl)-4'-(dimethylcarbamoyl)biphenyl, 4-cyano-1,2-epoxybutane, 1-(3-cyanophenyl)-2,3-epoxybutane, 2-cyanostyrene oxide, and 6-cyano-1-(1,2-epoxy-2-phenylethyl)naphthalene.

12. The catalyst system of claim 1, wherein the aprotic solvent comprises one or more selected from the group consisting of tributyl phosphate, tetrahydrofuran, dimethyl sulfoxide, dimethylformamide, and hexamethylphosphorotriamide.

13. The catalyst system of claim 1, wherein the epoxy compound comprises epichlorohydrin.

14. The catalyst system of claim 2, wherein the epoxy compound comprises epichlorohydrin.

15. The catalyst system of claim 8, wherein the epoxy compound comprises epichlorohydrin.

16. The catalyst system of claim 3, wherein the epoxy compound comprises epichlorohydrin.

17. The catalyst system of claim 4, wherein the epoxy compound comprises epichlorohydrin.

18. The catalyst system of claim 5, wherein the epoxy compound comprises epichlorohydrin.

* * * * *